United States Patent [19]

Tamura et al.

[11] Patent Number: 5,617,434
[45] Date of Patent: Apr. 1, 1997

[54] STRETCHED-PULSE FIBER LASER

[75] Inventors: Kohichi R. Tamura, Mito, Japan;
Erich P. Ippen, Belmont, Mass.;
Hermann A. Haus, Lexington, Mass.;
Lynn E. Nelson, Somerville, Mass.;
Christopher R. Doerr, Atlantic Highlands, N.J.

[73] Assignee: Massachusetts Inst. of Technology, Cambridge, Mass.

[21] Appl. No.: 635,846

[22] Filed: Apr. 22, 1996

Related U.S. Application Data

[63] Continuation of Ser. No. 418,812, Apr. 7, 1995, Pat. No. 5,513,194, which is a continuation of Ser. No. 268,821, Jun. 30, 1994, abandoned.

[51] Int. Cl.$^6$ .................................................... H01S 3/30
[52] U.S. Cl. ................... 372/6; 372/18; 372/94; 372/70; 372/10; 372/25
[58] Field of Search ............................. 372/6, 18, 94, 372/10, 70, 25, 31, 98

[56] References Cited

U.S. PATENT DOCUMENTS

| | | | |
|---|---|---|---|
| 4,685,107 | 8/1987 | Kafka et al. | 372/6 |
| 4,835,778 | 5/1989 | Kafka et al. | 372/6 |
| 5,224,194 | 6/1993 | Islam | 385/122 |
| 5,369,515 | 11/1994 | Majima | 359/125 |
| 5,513,194 | 4/1996 | Tamura et al. | 372/25 |
| 5,553,093 | 9/1996 | Ramaswamy et al. | 372/25 |

OTHER PUBLICATIONS

Tamura et al., "77-fs pulse generation from a stretched-pulse mode-locked all-fiber ring laser," *Optics Letters*, vol. 18, No. 13, pp. 1080–1082, Jul. 1, 1993.

Tamura et al., "Femtosecond all-fiber ring lasers," *LEOS* '93, Conf. Proceedings, p. 269, conference held Nov. 15–18, 1993.

Tamura et al., "Technique for obtaining high-energy ultrashort pulses from an additive-pulse mode-locked erbium-doped fiber ring laser," *Opt. Letters*, vol. 19, No. 1, pp. 46–48, Jan. 1, 1994.

Tamura et al., "Soliton versus nonsoliton operation of fiber ring lasers," *Appl. Phys. Letters*, vol. 64, No. 2, pp. 149–151, Jan. 10, 1994.

(List continued on next page.)

*Primary Examiner*—Leon Scott, Jr.
*Attorney, Agent, or Firm*—Theresa A. Lober

[57] ABSTRACT

A fiber laser for producing high energy ultrashort laser pulses, having a positive-dispersion fiber segment and a negative-dispersion fiber segment joined in series with the positive-dispersion fiber segment to form a laser cavity. With this configuration, soliton effects of laser pulse circulation in the cavity are suppressed and widths of laser pulses circulating in the cavity undergo large variations between a maximum laser pulse width and a minimum laser pulse width during one round trip through the cavity. The fiber laser also provides means for modelocking laser radiation in the laser cavity, means for providing laser radiation gain in the laser cavity, and means for extracting laser pulses from the laser cavity. Using selected positive- and negative-dispersion fiber segments, the laser cavity exhibits a net positive group velocity dispersion, and the ratio of the maximum laser pulse width to the minimum laser pulse width attained during one round trip through the cavity is greater than 5, and preferably greater than 10. The laser cavity may be configured as a linear cavity geometry, a ring cavity geometry, a figure eight geometry, or a Sagnac loop reflector geometry, among others. Preferably the ring cavity is configured to achieve unidirectional circulation of laser pulses in the ring cavity, and with this configuration, is shown to produce laser pulses having a pulse width of less than 100 fs and a pulse energy of at least 80 pJ.

23 Claims, 13 Drawing Sheets

High Energy Pulse Extraction

OTHER PUBLICATIONS

Fermann et al., "Generation of pulses shorter than 200 fs from a passively mode–locked Er fiber laser," *Optics Letters*, vol. 18, No. 1, pp. 48–50, Jan. 1, 1993.

Kafka et al. "Mode–locked erbium–doped fiber laser with soliton pulse shaping," *Optics Letters*, vol. 14, No. 22, pp. 1269–1271, Nov. 15, 1989.

Hofer et al., "Regenerative Nd:glass amplifier seeded with a Nd:fiber laser", *Optics Letters*, vol. 17, No. 11, pp. 807–809, Jun. 1, 1992.

Haus et al., "Additive–pulse modelocking in fiber lasers," *IEEE Jnl. of Quantum Electronics*, vol. 30, No. 1, pp. 200–208, Jan. 1994.

Tamura et al., "Self–starting additive pulse mode–locked erbium fibre ring laser," *Electronics Letters*, vol. 28, No. 24, pp. 2226–2227, Nov. 19, 1992.

Tamura et al., "Unidirectional ring resonators for self–starting passively mode–locked lasers," *Optics Letters*, vol. 18, No. 3, pp. 220–222, Feb. 1, 1993.

Fermann et al., "Additive–pulse–compression mode locking of a neodymium fiber laser," *Optics Letters*, vol. 16, No. 4, pp. 244–246, Feb. 15, 1991.

Yoshida et al., "Laser diode–pumped femtosecond erbium–doped fiber laser with a sub–ring cavity for repetition rate control," *Appl. Phys. Lett.*, vol. 60, No. 8, pp. 932–934, Feb. 24, 1992.

Duling III, "All–fiber ring soliton laser mode locked with a nonlinear mirror," *Optics Letters*, vol. 16, No. 8, pp. 539–541, Apr. 15, 1991.

Stretched-Pulse APM

Polarization APM

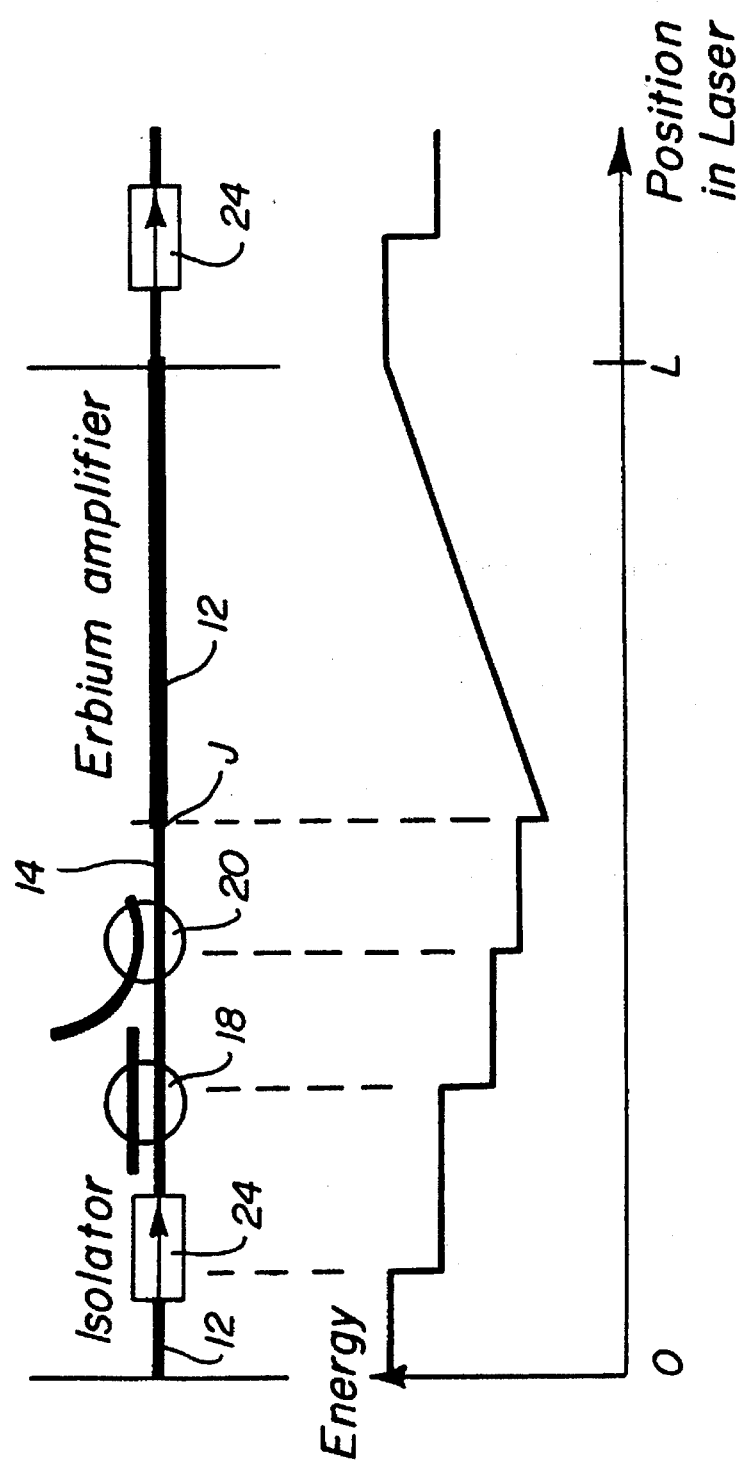
FIG. 7A Periodic Perturbations in Mode-locked Fiber Laser

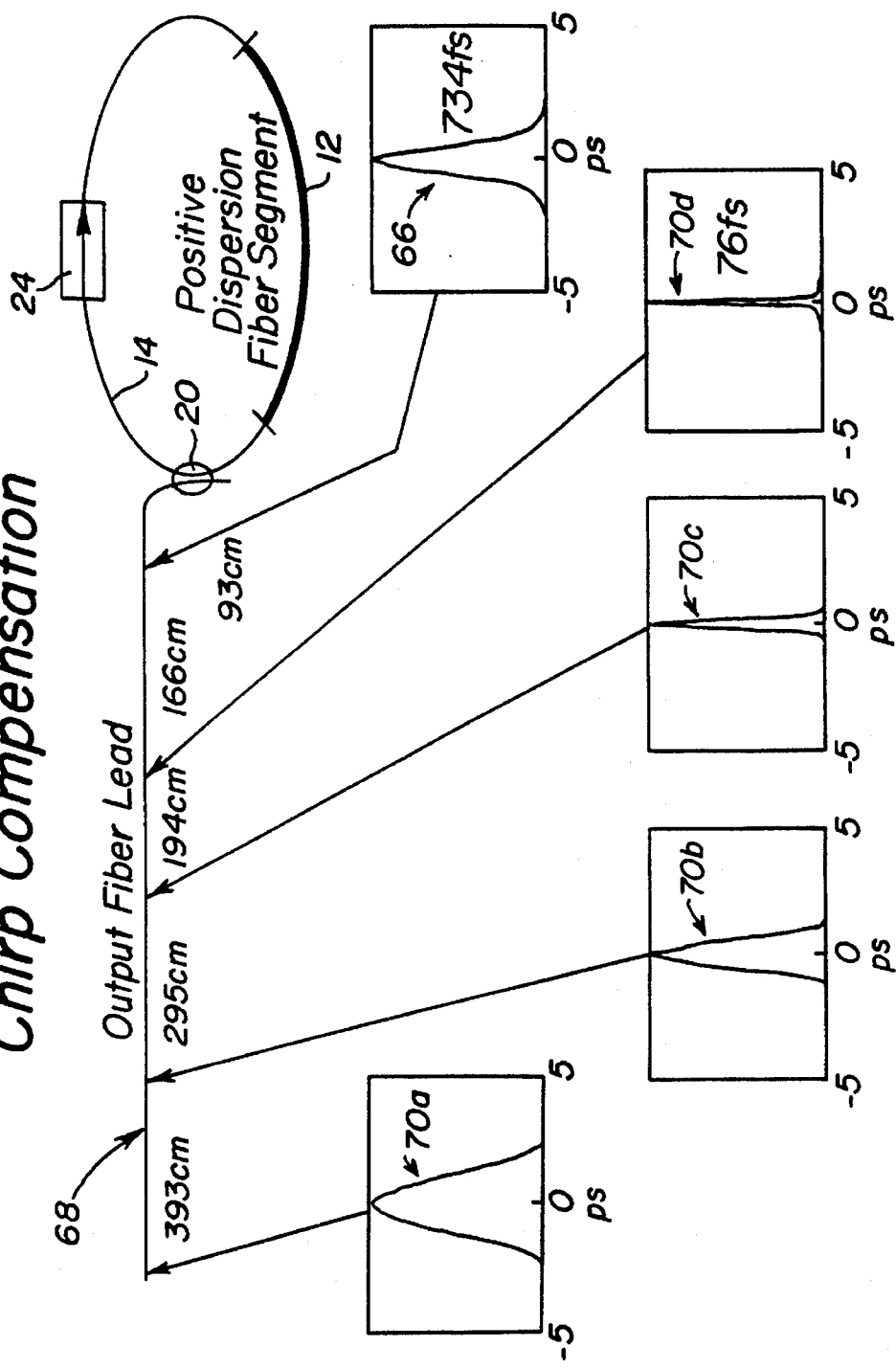
FIG. 8  Output Dispersive Delay Line – Positive Chirp Compensation

High Energy Pulse Extraction

FIGURE EIGHT

SAGNAC REFLECTOR

STRETCHED-PULSE FIBER LASER

This invention was made with government support under contract DAAL03-92-C-0001 awarded by the Joint Services Electronic Program, and under contract F49620-91-C-0091 awarded by the U.S. Air Force Office of Scientific Research. The government has certain rights in this invention.

This application is a continuation of copending application Ser. No. 08/418,812, filed Apr. 7, 1995, now U.S. Pat. No. 5,513,194 which in turn is a continuation of application Ser. No. 08/268,821, filed Jun. 30, 1994, now abandoned.

BACKGROUND OF THE INVENTION

This invention relates to lasers, and more particularly relates to fiber lasers.

Fiber lasers have been the subject of intense investigation due to their potential as a compact, inexpensive, and robust source of ultrashort laser pulses. Rare earth-doped fibers have been shown to be particularly advantageous for fiber laser designs in that they can provide, in a single element, the functionality of gain, self-phase modulation, and group-velocity dispersion. Mode-locked fiber laser designs incorporating rare earth-doped fibers have been shown for linear, ring, figure-eight, and reflector geometries.

Conventionally and historically, all-fiber mode-locked laser designs rely on operation in the soliton regime—that is, soliton pulse shaping is employed as a mechanism for producing laser pulses. This mechanism is based on the generation of solitons and their shaping by e.g., interference of two versions of the same pulse after appropriate modulation. The soliton pulse shape is maintained through the combined action of negative group velocity dispersion (GVD) and modelocking. Thus negative GVD is a requirement for effective soliton operation.

Kafka and Baer showed such a soliton fiber laser, Optics Letters 14, 1269 (1989) and U.S. Pat. No. 4,835,778, using an erbium-doped section of fiber to provide gain and a section of undoped fiber to ensure overall negative GVD. This laser uses a guided wave modulator for modelocking, allowing for bidirectional operation. While it is assumed that the erbium-doped fiber, 70 meters in length, generates laser emission in the negative-GVD region of the fiber, the exact contribution of the erbium-doped fiber was stated as unknown, and so 2 kilometers of standard telecommunications fiber was included to ensure negative GVD and correspondingly, soliton operation.

It has been later shown that this soliton operation leads to several undesirable phenomena; in perhaps the most limiting, soliton pulses are known to occur in chaotic bunches with no well-defined repetition rates—that is, there occur many pulses within one round trip time. In an effort to produce stable, uniformly periodic trains of soliton pulses, Hofer et al. and Fermann et al., Optics Letters 17, 807 (1992) and Optics Letters 18, 48 (1993) showed using a very short piece of rare earth-doped gain fiber, (neodymium and erbium, respectively) with a positive GVD, in combination with an intracavity prism pair (of inherently negative GVD) to obtain overall net negative GVD and soliton operation. A short piece of fiber was described as being advantageous for reducing the pulse reshaping that occurs per pass of the pulse through the fiber. Stable, bandwidth-limited soliton pulses as short as 180 fs and having an energy of 100 pJ were shown by Fermann to be produced using a 67 cm-long stretch of erbium-doped fiber, with positive GVD, and a polarizing ZnS prism pair, having negative GVD—passive amplitude modulation was achieved using nonlinear polarization evolution.

An all-fiber laser design that does not, like the lasers just described, rely on bulk intracavity elements for dispersion compensation has been shown superior in that unlike those lasers, it does not require "fine tuning" of the geometric relationship of the elements and is impervious to temperature-dependent instability of the element positions. Tamura et al. showed an all-fiber ring laser, Electronics Letters 28, 2226 (1992) that achieved great simplicity and robustness while at the same time achieving soliton operation. Here a 4.8 meter-long erbium-doped fiber, which provided negative GVD, was shown fully integrated with a nonlinear polarization rotator to achieve passive additive pulse modelocking. It was demonstrated with this laser design, Optics Letters 18, 220 (1993), that unidirectional operation of a fiber ring with such a scheme provides further control of uniformly periodic single-pulse soliton operation and furthermore, allows for true self-starting (from noise alone).

All of these soliton-based laser designs face common limitations to achieving even higher energy than that demonstrated. Operation in the soliton regime constrains the single-pulse energy to be close to that of a fundamental soliton ($E_{sol}$)—recall that a soliton is a pulse resulting from a balance between dispersive effects and self phase modulation whereby the pulse will propagate through a dispersive medium without changing shape. Thus a pulse that is too long will in effect make itself shorter until it reaches a balance point, $E_{sol}$, and will then propagate at $E_{sol}$. This fundamentally limits the achievable pulse energy and produces the phenomenon of random multiple-pulse trains described earlier. While using a shorter fiber length was shown to avoid multiple pulsing, the single pulse energy and duration remains limited.

Single pulse soliton energy is determined based on the soliton area theorem, which quantifies the relationship between the soliton pulse energy and width; for a given peak power, the duration and energy of a pulse are fixed. The peak power of a soliton laser may become clamped by, e.g., additive pulse modelocking, however, which may saturate because it is interferometric in nature. While in principle this lo saturation level is adjustable, as a practical matter it limits the ability of the laser to self-start, and so does not provide a practical alternative for increasing pulse energy.

A further pulse limitation is caused by the periodic perturbation of the soliton in its round trip around the laser fiber. The nonlinear phase shift in one round trip is determined by the pulse energy and width. Because this nonlinear phase shift is also limited by the sideband generation of the periodically perturbed Soliton, an upper limit to the energy of the soliton of a given width is imposed by the phase shift. A soliton becomes highly unstable when the period of perturbation approaches $8Z_0$, where $Z_0$ is the soliton period. Because a mode-locked laser periodically perturbs the soliton pulse at the cavity round-trip length L, the shortest soliton that can be supported stably must have $8Z_0 > L$. In practice, the shortest observed pulses typically have $L \equiv 1Z_0$ or $2Z_0$. For ultrashort pulses, say <100-fs, this creates a practical difficulty in that $Z_0 < 25$ cm in standard fiber.

Thus, the substantial gains made in the design of all-fiber lasers have yet to achieve operation in the soliton regime that produces high-energy ultrashort laser pulses.

SUMMARY OF THE INVENTION

The fiber laser of the invention overcomes the limitations of past fiber lasers to provide an all-fiber laser operating outside of the soliton regime for producing high energy ultrashort laser pulses. The invention thus provides, in one general aspect, a fiber laser having a positive-dispersion fiber segment and a negative-dispersion fiber segment joined in series with the positive-dispersion fiber segment to form a laser cavity. With this configuration, soliton effects of laser pulse circulation in the cavity are suppressed and widths of laser pulses circulating in the cavity undergo large variations between a maximum laser pulse width and a minimum laser pulse width during one round trip through the cavity. The fiber laser also provides means for modelocking laser radiation in the laser cavity, means for providing laser radiation gain in the laser cavity, and means for extracting laser pulses from the laser cavity.

In preferred embodiments, the laser cavity exhibits a net positive group velocity dispersion, and the ratio of the maximum laser pulse width to the minimum laser pulse width attained during one round trip through the cavity is greater than 5, and preferably greater than 10. It is preferable that the means for providing laser radiation gain in the laser cavity comprises a segment of rare-earth doped fiber, such as erbium- or thulium-doped fiber. The rare-earth doped fiber is preferably positive-dispersion fiber exhibiting a dispersion of at least +0.030 $ps^2/m$. The laser cavity preferably exhibits a group velocity dispersion of at least +0.005 $ps^2$, with the negative-dispersion fiber segment exhibiting a negative dispersion of at least −0.010 $ps^2/m$.

In other preferred embodiments, the laser cavity comprises a linear cavity geometry, a ring cavity geometry, a figure eight geometry, or a Sagnac loop reflector geometry. Preferably the ring cavity is configured to achieve unidirectional circulation of laser pulses in the ring cavity, and laser pulses extracted from the ring cavity preferably exhibit a pulse width of less than 100 fs and a pulse energy of at least 80 pJ.

In other preferred embodiments, the modelocking means provides passive modelocking of the laser radiation in the laser cavity, and more preferably produces additive pulse modelocking using a nonlinear polarization rotator. The nonlinear polarization rotator uses elliptically polarized laser pulses to provide intensitydependent loss and transmission of laser energy such that substantially off-peak laser pulse intensity energy is rejected and substantially on-peak laser pulse intensity energy is passed to continue circulating in the laser cavity. Preferably, the nonlinear polarization rotator comprises all-fiber components. A wavelength filter such as a birefringent filter is preferable for tuning and frequency bandwidth control of laser radiation in the laser cavity.

In other preferred embodiments, a wavelength-division-multiplexed input coupler is used for launching radiation into the laser cavity, and preferably, a semiconductor diode source or diode-pumped solid state source is used for pumping radiation into the laser cavity.

It is preferred that the means for extracting laser pulses from the laser cavity is positioned just at the beginning of the negative-dispersion fiber segment and the polarization rotator is positioned just after the pulse extraction means, and further that unidirectional laser pulse circulation is achieved such that laser pulse energy is highest during pulse circulation through the positive-dispersion fiber segment and laser pulse energy is lowest during pulse circulation through the negative-dispersion fiber segment. Preferably, the means for extracting laser pulses from the laser cavity comprises a fiber segment forming a dispersive delay line for compensation of any positive chirp exhibited by extracted pulses or a bulk dispersive element for compensation of any chirp exhibited by extracted laser pulses. The fiber segment is of a length selected to minimize extracted laser pulses' widths by wavelength chirp compensation, and the bulk dispersive element is preferably a silicon slab.

In other preferred embodiments, the means for extracting laser pulses from the laser cavity is an intensity-dependent rejection port of the polarization rotator, whereby off-peak intensity laser pulse energy rejected by the polarizer is extracted from the laser cavity through the rejection port. Preferably, the rejection port comprises a polarizing beam splitter, and includes a fiber segment or bulk dispersive element like that just described for chirp compensation.

The fiber laser of the invention, providing high energy ultrashort laser pulses heretofore unachievable, has a wide range of applications in the fields of test instrumentation biomedical engineering, spectroscopy, telecommunications, and many others. The many advantages of this compact, inexpensive, robust source of ultrashort pulses may thus be widely employed to advance technology beyond its current level.

DESCRIPTION OF A PREFERRED EMBODIMENT

The invention is pointed out with particularity in the appended claims. The above and further features and advantages of the invention may be better understood by referring to the following description of a preferred embodiment taken in conjunction with the accompanying drawings, in which:

FIG. 7A is a plot of the energy variation experienced by a laser pulse traversing the laser configuration of FIG. 1A;

FIG. 8 is a schematic diagram of an output fiber segment coupled to the laser configuration of FIG. 1A and the output laser pulses obtained through the segment;

The fiber laser of the invention achieves high-energy ultrashort laser pulses, even exceeding the energy of those previously demonstrated, by intentionally operating outside of the soliton regime, contrariwise to conventional theories suggesting that soliton operation is preferable. Accordingly, the fiber laser of the invention does not require a net negative dispersion from the laser fiber, as was required by prior fiber lasers. The inventors herein have recognized that this nonsoliton scheme achieves reduction of unwanted soliton effects while at the same time producing pulse energies larger than those achieved in the soliton regime, to thereby produce shorter and higher energy pulses than heretofore has been achievable in fiber lasers.

Figure 1A:
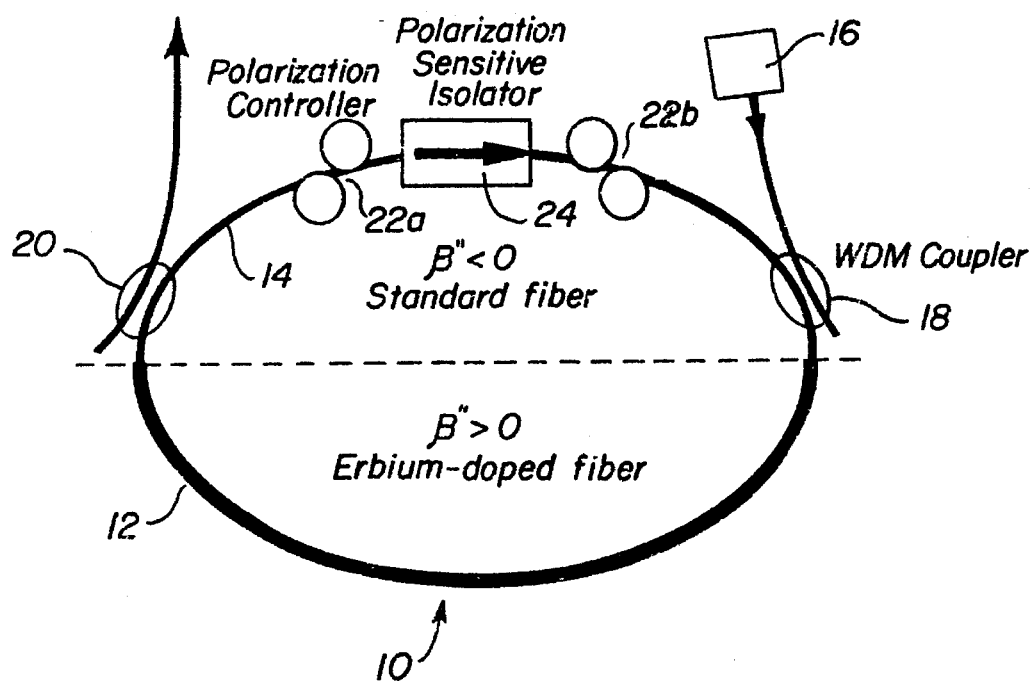
FIG. 1A is a schematic diagram of one embodiment of a fiber laser according to the invention.

Referring now to FIG. 1A, the fiber laser 10 of the invention is shown as a ring laser having two sections of fiber, namely a gain fiber segment 12, which is a positive-dispersion fiber, connected in series with a negative-dispersion fiber segment 14. The fiber laser of the invention could also be configured in a linear, figure-eight, Sagnac loop reflector, or other suitable laser geometry, as will be understood by those skilled in the art. The ring geometry will be described here as one example of the many geometries to which the invention could be applied.

It should be noted, however, that the ring configuration, including an isolator, as described below, greatly reduces the backscatter from various reflecting obstacles that is unavoidable in a standing wave cavity or in the figure-eight configuration. Such reflections cause the mode-spectrum of the resonator to be slightly nonuniform, thereby impeding self-starting.

Preferably, the positive- and negative-dispersion fiber segments used in the ring laser 10 of the invention both achieve large magnitudes of dispersion. For example, the positive-dispersion gain segment 12 may be erbium-doped fiber to achieve a dispersion of +0.11±0.010 ps$^2$/m at 1.55 µm; such fiber is available from American Telephone and Telegraph Company. Fibers doped with other rare earth elements, such as neodymium, may also be employed. A dispersion value for the gain segment fiber may be estimated numerically from the chosen waveguide geometry and material parameters: for example, using a pump loss value of 55 dB/m at 1.535 µm, and specifying a core fiber diameter of 2.5 µm, a δn of 0.035, and a gain segment length of 1.13 meters, the net positive dispersion from the gain fiber segment 12 of the ring laser is +0.113±0.011 ps$^2$. The gain segment may range in length, however, between 0.94 and 1.36 meters, for example, as explained below.

The negative dispersion segment 14 of the laser employs standard fiber of a total length between, for example 2.88 and 3.37 meters, and having a dispersion of approximately −0.022 ps$^2$/in at 1.55 µm. Such fiber is available as Corning SMF28 from the Corning Company. The net negative dispersion of this fiber segment is thus −0.076 ps$^2$. The preferable fiber lengths, corresponding net GVD of the ring laser, and its consequences for producing high energy pulses, will be explained below, once the other elements of the laser are introduced.

Turning then back to the figure, the other elements of the fiber laser 10 of the invention include a 980 nm Ti:sapphire laser pump 16, which produces pump light to be launched into the fiber ring through a wavelength-division-multiplexed coupler 18, made from Corning Flexcor 1060 fiber. An argon laser pump (not shown), available from Spectra-Physics, may be used to pump the Ti:sapphire laser. In many cases it may be preferable to use an alternative to this Ti:sapphire pump scheme; for example, a semiconductor diode source and diode-pumped solid state source each provides great advantage in their compactness, among other advantages. Thus, as will be recognized by those skilled in the art, the chosen pump source should be selected based on considerations of size, cost, ease of use, etc., and the fiber laser of the invention is not limited to a Ti:sapphire pump or any other single pump scheme.

Also included in the fiber laser configuration are an output coupler 20, being a 90/10 fiber coupler made of corning SMF 28 fiber, polarization controllers 22, and a unidirectional, polarization-sensitive isolator 24. The particular operation of each of these elements will be described in detail below.

Figure 1B:
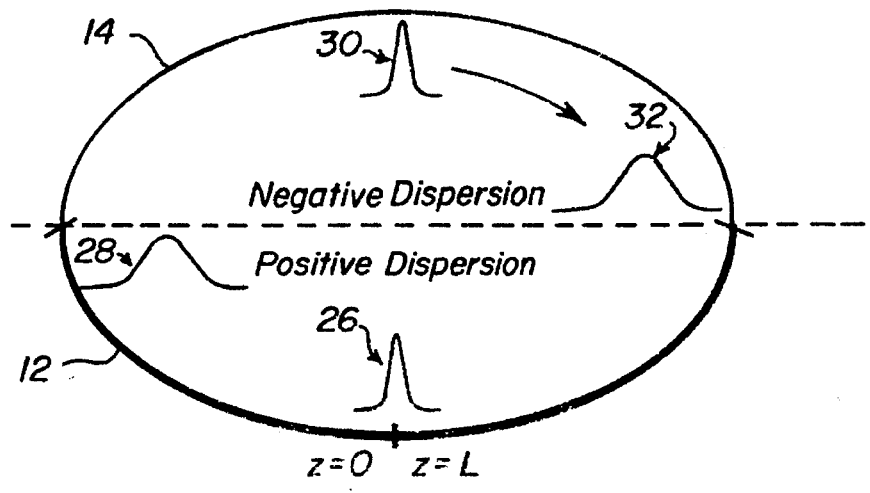
FIG. 1B is a schematic diagram illustrating the principle of operation of the laser of FIG. 1A.

Considering first the general operation of the fiber ring laser having this configuration, and referring to FIG. 1B, the fiber laser of the invention provides additive pulse mode locking (APM) of laser pulses which are stretched as they make a round trip around the laser. That is, the large positive- and negative-dispersion segments produce a pulse width that changes drastically during one round trip of the laser. For example, as shown in the figure, in the positive-dispersion segment 12 of the laser, the positive dispersion is high enough that a pulse 26 of say 100 fs in duration experiences large amounts of spreading as it traverses the gain segment to produce a spread pulse 28 at the end of that segment 12. Thereafter, the pulse, in traversing the negative-dispersive fiber 14, shrinks and reverses its leading wavelength, to produce a "flipped" narrow pulse 30. This narrow pulse then spreads due to the negative dispersion to produce a "flipped" spread pulse 32 at the end of the negative segment 14, where the pulse reaches the length L of the fiber ring. With this spreading and narrowing action, the width of a circulating pulse may change by as much as 5X, or even an order of magnitude or more during one round trip—in other words, the stretching factor, defined here to be the ratio of maximum to minimum pulse width within the loop, may exceed one order of magnitude in one round trip.

Figure 1C:
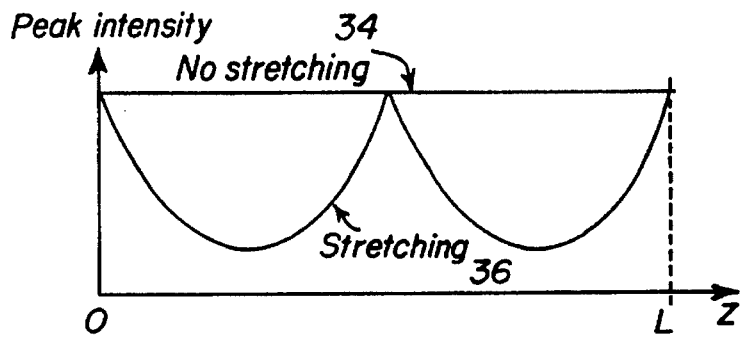
FIG. 1C is a plot comparing the variation in laser pulse peak intensity as a function of distance in the fiber laser of FIG. 1A and prior art fiber lasers.

This spreading and narrowing of a circulating pulse serves to lower the average peak power of the pulse compared with that which would be experienced by an unchanging transform-limited pulse of the same bandwidth. This then acts to effectively reduce the nonlinearity of the ring and helps to avoid saturation of the APM mechanism. As depicted in FIG. 1C, in soliton operation, where no stretching of a pulse occurs, the peak intensity 34 of a circulating pulse remains the same for the duration of its traversal around the ring. Conversely, in stretched-pulse operation, the peak intensity 36 of a circulating pulse undergoes large variations during its traversal around the ring, thereby exhibiting a reduced peak phase shift per pass over soliton operation.

To illustrate determination of the most preferable net GVD of the fiber ring of the invention, and to illustrate the advantages of avoiding soliton operation, consider the total GVD dispersion of the laser as $D_T=\Sigma_i\beta''_i l_i$, wherein $\beta''_i$ is the GVD of a fiber with length $l_i$. By experimentally varying the lengths of the two fiber segments 12, 14, $D_T$ may be varied. The inventors herein have demonstrated this by first varying the amount of positive dispersion in the gain segment 12 by varying its length between 107.7 cm and 136.2 cm while holding the negative-dispersion segment 14 at 288.0 cm. Then the positive erbium-doped gain segment 12 is fixed at 94 cm and the negative-dispersion segment is varied in length between 276.0 cm and 674.0 cm; here the changes in length are made to the portion of fiber between the output coupler 20 and the polarization controller 22. With these length variances, $D_T$ is correspondingly varied between $\approx$–0.088 ps$^2$ and +0.032 ps$^2$; the uncertainty in these values is $\approx\pm0.006$ ps$^2$.

First consider the case with $D_T\approx0.088$ ps$^2$. Here soliton shaping is expected, as in the prior art fiber laser systems. Indeed, in this case, the fiber laser produces the commonly observed spectral sidebands due to periodic perturbations of a circulating soliton. The cavity length achieving this GVD, $L_c$=8.23 m, corresponds to an average dispersion of –0.011 ps$^2$/m. The shortest pulse width produced by this configuration is 257 fs at full width half-maximum (FWHM), assuming a sech profile. This gives a soliton period $Z_0$=3.0 m, so that $L_c$=2.74$Z_0$. Typically, $L_c\approx1Z_0$ to $2Z_0$ when the instability due to periodic perturbations limits the pulse width of the soliton. The spectral width for this configuration is 10.6 nm, which corresponds to a time-bandwidth product of 0.33. The stretching factor for this configuration is estimated to be ~3 over the ring length of 8.23 m.

It is found that the temporal stretching of the pulse in the ring increases as the relative amount of positive to negative dispersion fiber is increased. For increased pulse stretching, even when operating with $D_T<0$, soliton sideband generation is reduced and the pulse shape deviates from sech and shows better agreement with a Gaussian profile. For $D_T\approx-0.027$ ps$^2$, the stretching factor is seen to reach ~5 over a ring length of 5.57 m, and to have a corresponding time-bandwidth product of 0.46.

Figure 2:
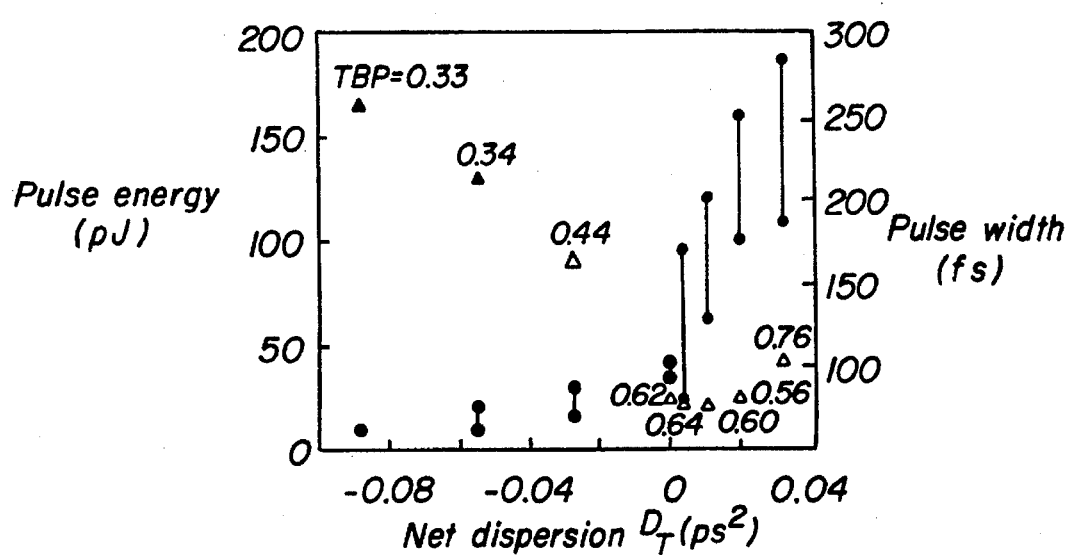
FIG. 2 is a plot of pulse energy and shortest FWHM pulse width versus net dispersion for the fiber laser of FIG. 1A; in the plot dark triangles assume a sech fit, and open triangles assume a Gaussian fit.

For $D_T\geq0$, the fiber ring laser exhibits several key differences from operation with $D_T<0$. In the positive dispersion regime, the output pulses are significantly more chirped, with large spectral widths of >50 nm. Maximum stretching factors of ~12, 15, 21, and 20 are estimated for $D_T$ (with corresponding ring lengths) of $\approx$0.0 ps$^2$ (4.37 m), +0.011 ps$^2$ (4.51 m), +0.020 ps$^2$ (4.63 m), and +0.032 ps$^2$ (4.79 m), respectively. With this high degree of stretching, nonlinear saturation is avoided and the pulse energies are significantly higher than for less stretching. FIG. 2 shows the minimum pulse widths (under operation at maximum pulse energy), the time-bandwidth products, and the pulse energy ranges observed for this range of variation in $D_T$. The rapidly increasing output energy for increasingly positive $D_T$ is apparent. In general, when $D_T>0$, the time-bandwidth products are seen to be in the range of ~0.55 to 0.65 for the shortest pulses which indicates some departure from the transform-limited Gaussian pulse shape. This may partially be due to third-order dispersion. Another factor may be spectral filtering by the nonuniform erbium gain fiber segment.

Note that the highest pulse energies are seen to be obtained for DT$\approx$+0.020 ps$^2$ and +0.032 ps$^2$. However, these dispersion levels do not correspond to the shortest pulse durations, as shown in the figure. The output spectra in these two cases are highly asymmetric. Also, the compressed pulses exhibit broad wings, which may be due to higher order soliton effects in the output fiber lead, not the ring fiber itself.

Figure 3:
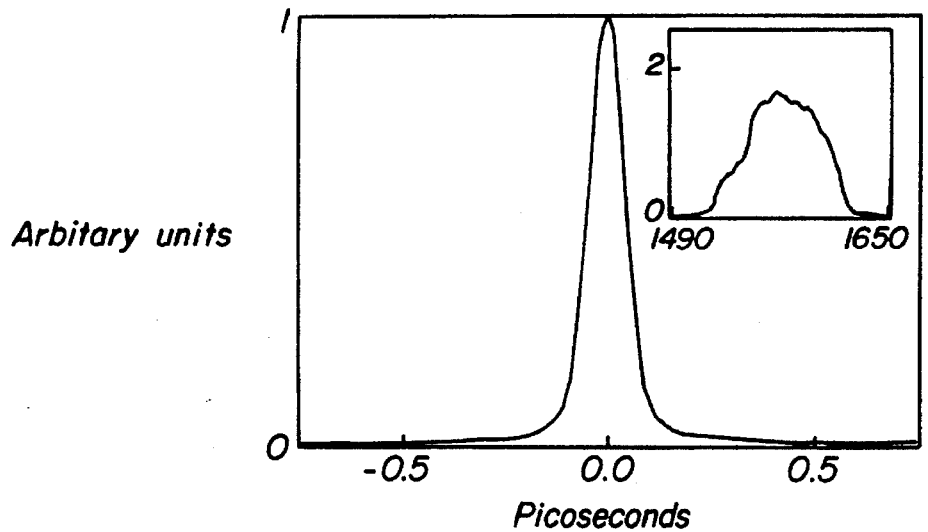
FIG. 3 is a plot of the autocorrelation and spectrum of a 76 fs laser pulse, assuming a Gaussian amplitude profile, generated by the laser configuration of FIG. 1A for a net positive GVD.

The shortest and cleanest pulses are seen to occur for operation of $D_T$ between $\approx$0.0 ps$^2$ and +0.011 ps$^2$. FIG. 3 shows the autocorrelation and spectrum of a 76 fs pulse, assuming Gaussian, generated when $D_T\approx$+0.011 ps$^2$. This is the shortest pulse observed for the fiber ring laser of the invention. The spectral width is here 64 nm, corresponding to a time-bandwidth product of 0.60. The output power is 5.1 mW at a 24.5 ns repetition rate, giving a pulse energy of >100 pJ. Note that the output power is here measured for a 10% value of output coupling. Even higher output pulse energies may be achieved by optimizing the output coupling ratio.

Figure 4:
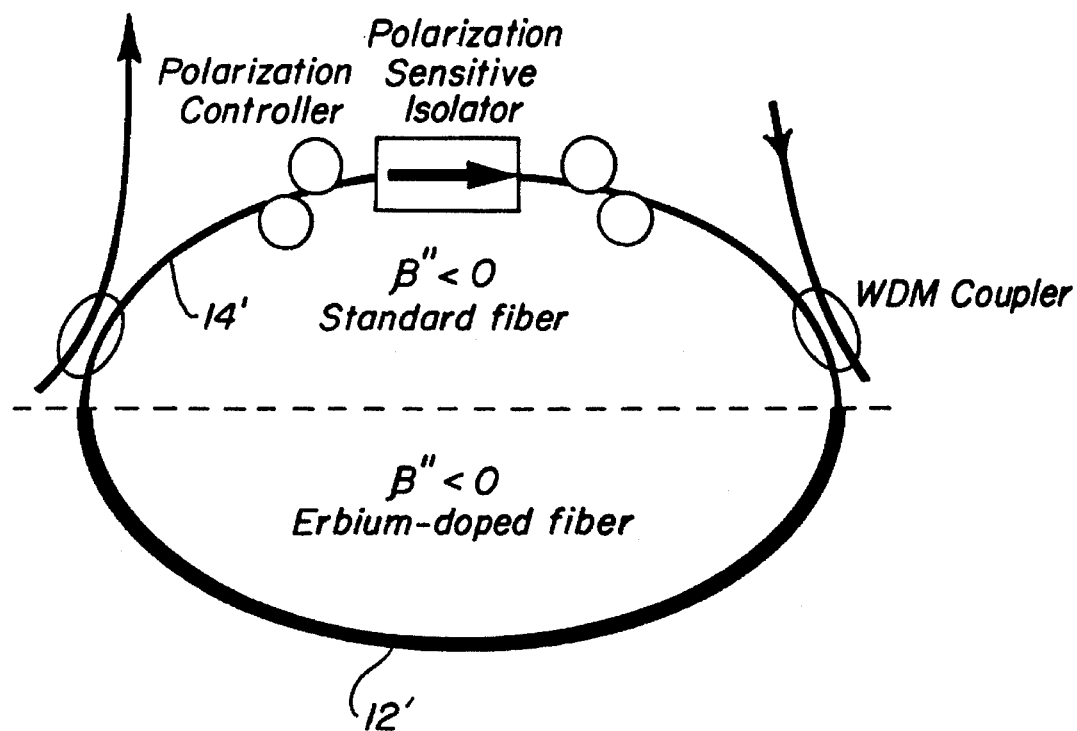
FIG. 4 is a schematic diagram of a prior art soliton fiber ring laser configuration.

It is instructional to compare this optimized stretched-pulse fiber ring laser with the operation of a conventional soliton fiber ring laser. FIG. 4 illustrates such a laser, demonstrated previously by the inventors herein, Electronics Letters 28, 2226 (1992). In this soliton laser, an erbium-doped gain fiber segment 12' comprises negative-dispersion fiber, as does the remaining standard fiber segment 14'—thus the laser operates in the soliton regime. With a total ring length of 4.8 m and a net GVD of –0.99 ps$^2$, this laser produces 9 pJ laser pulses of 450 fs in width (using a sech fit).

Figure 5A:
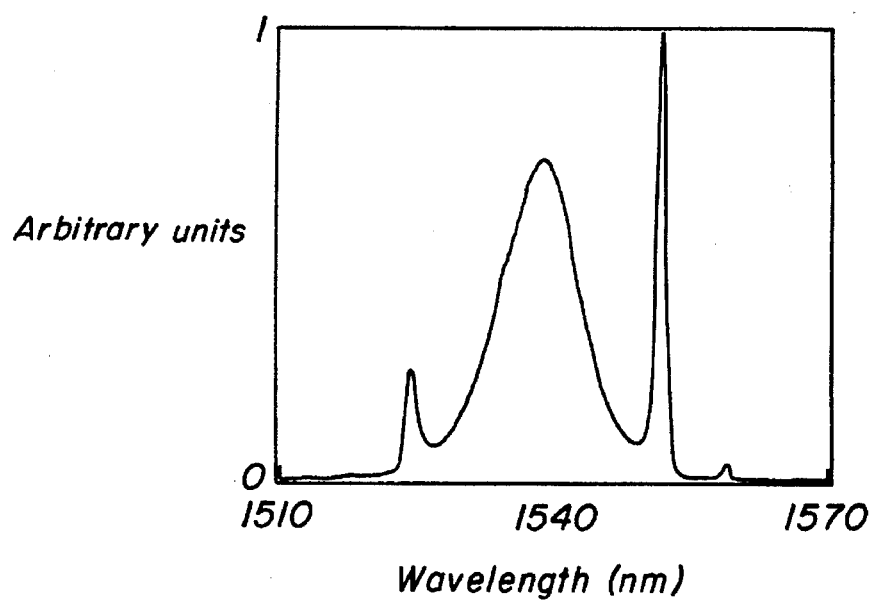
FIG. 5A is a plot of the spectrum of a laser pulse produced by the laser configuration of FIG. 4.
Figure 5B:
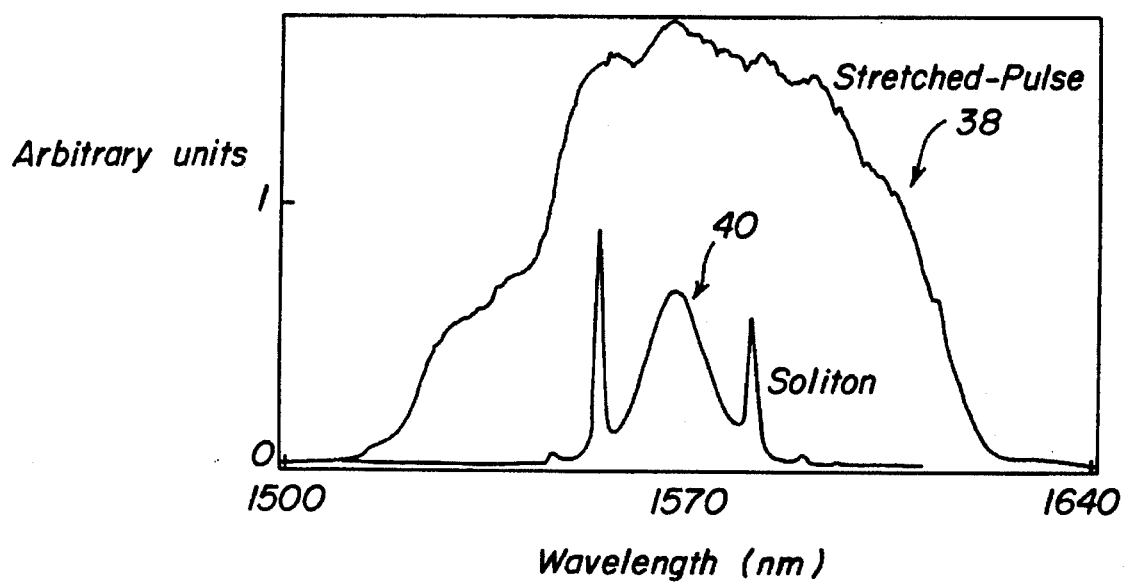
FIG. 5B is a plot comparing the spectra of a laser pulse produced by the laser configuration of FIG. 1A and a laser pulse produced by the laser configuration of FIG. 4.

FIG. 5A shows the spectrum of this pulse, exhibiting the expected spectral sidebands typical of soliton operation. FIG. 5B shows the output spectrum of both a stretched-pulse 38 and a soliton 40. Note the dramatic contrast in spectrum width between the stretched-pulse 38 and the soliton 40. Table 1 below summarizes the pulse characteristics achievable using a conventional soliton fiber ring laser and the stretched-pulse fiber ring laser of the invention.

TABLE 1

|  | Fiber Soliton Laser | Stretched-Pulse Fiber Laser |
| --- | --- | --- |
| Pulse Energy: | 12 pJ | 110 pJ |
| Output Power: | 0.5 mW | 5 mW |
| Pulse Width | 311 fs | 76 fs |
| Spectral Width: | 10 nm | 60 nm |
| TBP: | 0.38 | 0.60 |
| Repetition Rate: | 41 MHz | 45 MHz |

It must be noted again that the dramatic increase in performance of the stretched-pulse laser over the soliton laser, and particularly its ability to reach sub –100 fs pulse widths while at the same time achieving pulse energy greater than 110 pJ, was a result of recognition by the inventors that operation outside of the soliton regime o (i.e., net negative GVD regime) eliminates or greatly reduces soliton effects while at the same time achieving energy gains not possible in soliton operation. Heretofore it was understood and expected that soliton operation is absolutely necessary for achieving high-energy ultrashort pulses. Indeed, prior fiber ring laser designs suggest that nonsoliton fiber laser operation would be suboptimal. The fiber laser of the invention, providing for the first time sub –100 fs pulses at high energy, demonstrates that a new laser paradigm, namely, stretched-pulse operation, goes beyond soliton operation to successfully achieve the desired laser performance.

Turning now to the other elements of the fiber ring laser of the invention, it was mentioned above that the laser includes a polarization sensitive isolator and polarization controllers to achieve unidirectional pulse circulation in the fiber ring (FIG. 1). The polarization isolator/rotator scheme used here provides both additivepulse modelocking (APM) and the ability to truly self-start the laser from only cw noise. The term self-starting is usually applied to lasers that do not contain an active modulating element. Many systems that are denoted self-starting cannot be depended upon to start and to stay modelocked indefinitely unless triggered by some means. In contrast, the fiber ring laser of the invention "really self-starts" without any triggering, and stays modelocked as long as it is being pumped.

Figure 6A:
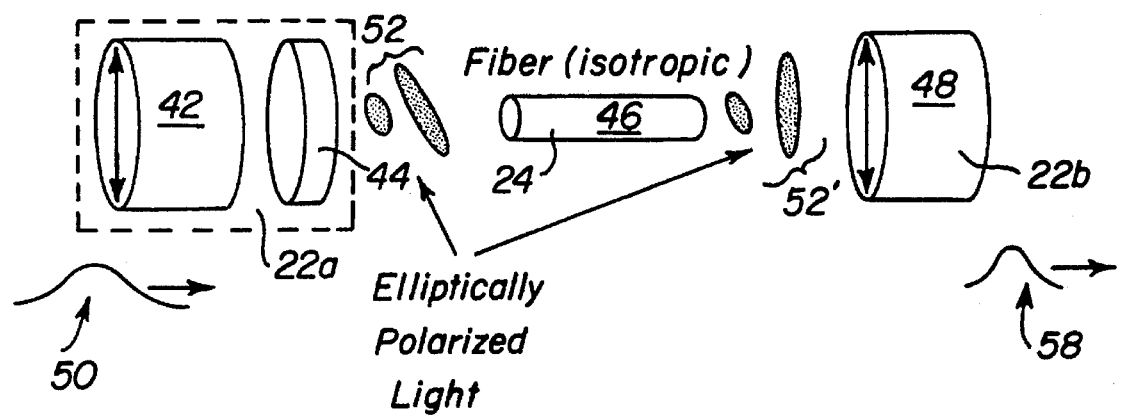
FIG. 6A is a diagrammatic illustration of the components of one additive pulse modelocking mechanism according to the invention.

FIG. 6A is useful for explaining the APM action produced throughpolarization rotation. The polarization controllers 22a, 22b and the polarizer itself 24 together form a nonlinear polarization rotation interferometer, comprising a polarizer 42, a wave plate 44, available from Virgo Optics, an isotropic Kerr medium, available from Isowave, and which may itself be a fiber 46, and an analyzer 48, available from CVI. In fact, all of these four elements may be realized using fiber or as a bulk element. Bulk elements will be described here to facilitate the discussion. In operation, when a laser pulse 50 reaches the polarizer 42 and is linearly polarized by it, the wave plate 44 transforms the linear polarization into elliptic polarization, shown schematically as 52. This elliptic polarization is then rotated via the Kerr effect in the isotropic medium 46, with the angle of rotation being proportional to the intensity.

Figure 6B:
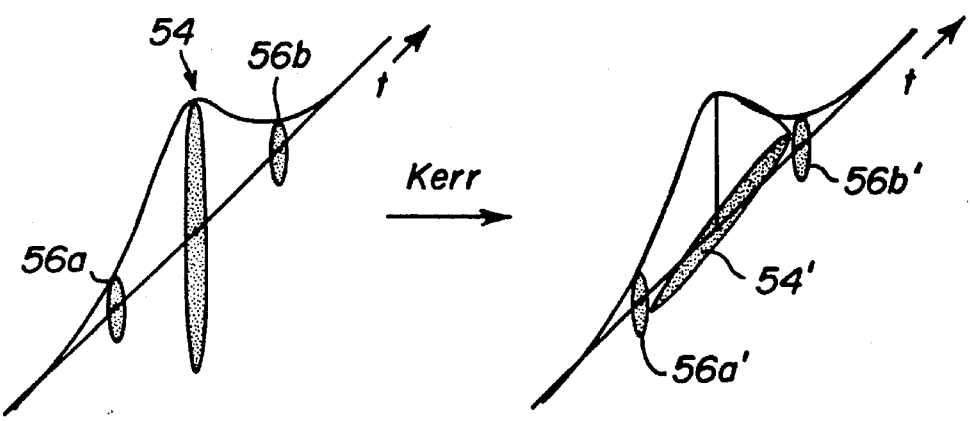
FIG. 6B is an illustration of intensity-dependent polarization achieved by the modelocking mechanism of FIG. 6A.

For example, as shown in FIG. 6B, after passing through the isotropic medium, peak intensities 54 may be rotated to take on a new angle, as indicated by 54', while off-peak, lower intensities 56a, 56b retain an original rotation 56a', 56b'. The analyzer 48 then passes only the peak intensities, which have been rotated 52' to correspond to the analyzer polarization. The off-peak intensities, being of an unmatched polarization with the analyzer, are rejected, whereby a pulse 58 leaving the analyzer has shed much o of the off-peak intensity. In this way, one may achieve intensity-dependent loss and transmission. If the wave plate 44 produces a bias polarization such that the rotation of the ellipse increases the throughput, APM action is achieved. The system described here provides >40 dB of isolation with a 0.7 dB insertion loss.

Using this polarization scheme, the fiber ring laser is shown to achieve self-starting mode locking to a single pulse per round trip at a launched pump power of approximately 280 mW and an output signal power of 5 mW—approximately 70% of the incident pump light is launched into the erbium gain fiber. A mode-locking hysteresis is observable, and pulsing is maintained at as low as 235 mW of launched pump power and 4.2 mW of output signal power. At very high pump levels (>310 mW) some cw lasing may occur simultaneously with stable pulsed operation. The cw wavelengths (1533 and 1567 nm) are the same as those for the cw below the modelocking threshold. This may be due to the presence of Fabry-Perot subcavities in the ring that reach threshold independently. Reduction of splice reflections could eliminate this effect.

A birefringent filter (not shown) may be incorporated with the APM system just described to provide the ability to fine tune the polarization without the need for adjusting the controller elements once they are in place, as will be understood by those skilled in the art; this then provides control of frequency bandwidth of the laser cavity. It should be noted that using, e.g., a YIG crystal (5.4 mm) in the isolator, the dispersion of the crystal must be considered for its contribution to the net GVD of the fiber ring. Here a YIG crystal is estimated to contribute +0.003 ps$^2$ of dispersion to the ring.

Figure 7B:
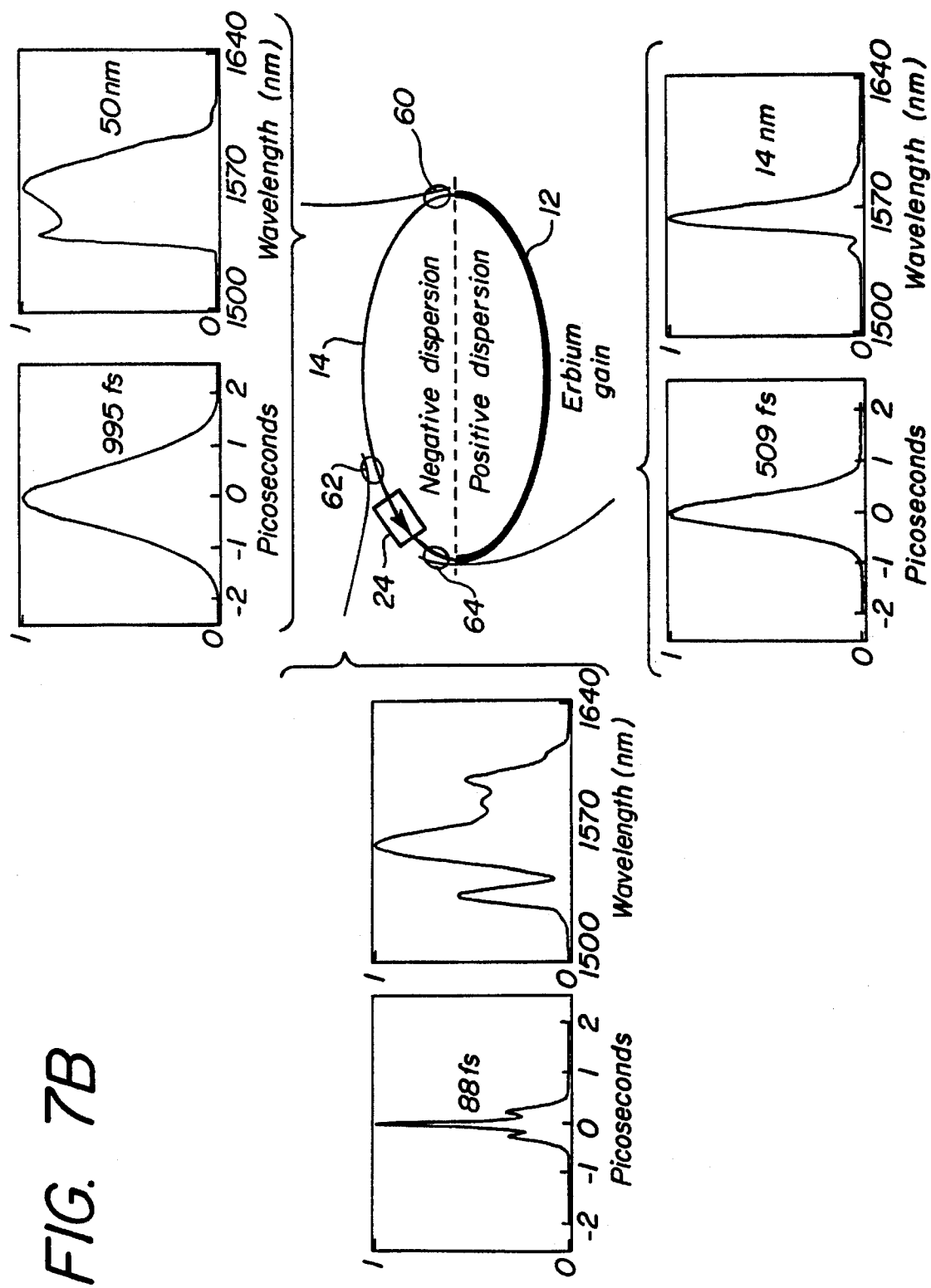
FIG. 7B is a schematic diagram of one possible ring laser directionality and corresponding output spectra for the laser configuration of FIG. 1A.

Considering now the placement and functionality of the output coupler 20 (FIG. 1), the inventors herein have analyzed the pulse energy variations occurring during one o round trip to determine the optimum point of output coupling for the stretched-pulse operation of the laser. As shown in FIG. 7A, periodic perturbations in the laser configuration produce corresponding periodic pulse energy variations. For one possible starting point in the ring, denoted as "0," a pulse leaving the erbium-doped positive-dispersion segment 12 has some given energy level. Upon passage through each of the isolator 24, output coupler 18, and input coupler 20, the pulse loses energy, dropping to a lower energy at each of these points (shown in no particular order, but all assumed to be located in the negative-dispersion fiber segment 14). Even the junction J between the two fiber segments produces an energy loss. Then, traveling through the erbium gain segment, the pulse regains energy until it returns to its starting point, o having traversed a distance L, the length of the ring and coming to have the energy level at which it started with.

Based on this energy loss and gain cycle, one may determine the optimum output coupling of the stretched-pulse on its traversal around the fiber ring. In one possibility, shown in FIG. 7B, the directionality and position of the polarizer/isolator 24 is such that once the pulse traverses the gain segment 12 and has attained a corresponding high energy and power, it then traverses the negative-dispersion segment 14 before encountering the polarizer/isolator. Considering three output locations, one at the start of the negative dispersion segment 60, one just before the polarizer/isolator 62, and one immediately after the polarizer/isolator 64, it is clear that the pulse width and spectrum is quite different at each of these points (the figure shows the width and spectrum of the pulse at each of these points). None of the spectrum after the positive-dispersion segment (point 60), the spectrum after traversal of the negative-dispersion segment (point 62), or the spectrum after traversal of the polarizer/isolator (point 64) are optimal—note the unwanted spectral sidebands. Thus with this isolator direction, no single optimum output coupling location is evident.

Figure 7C:
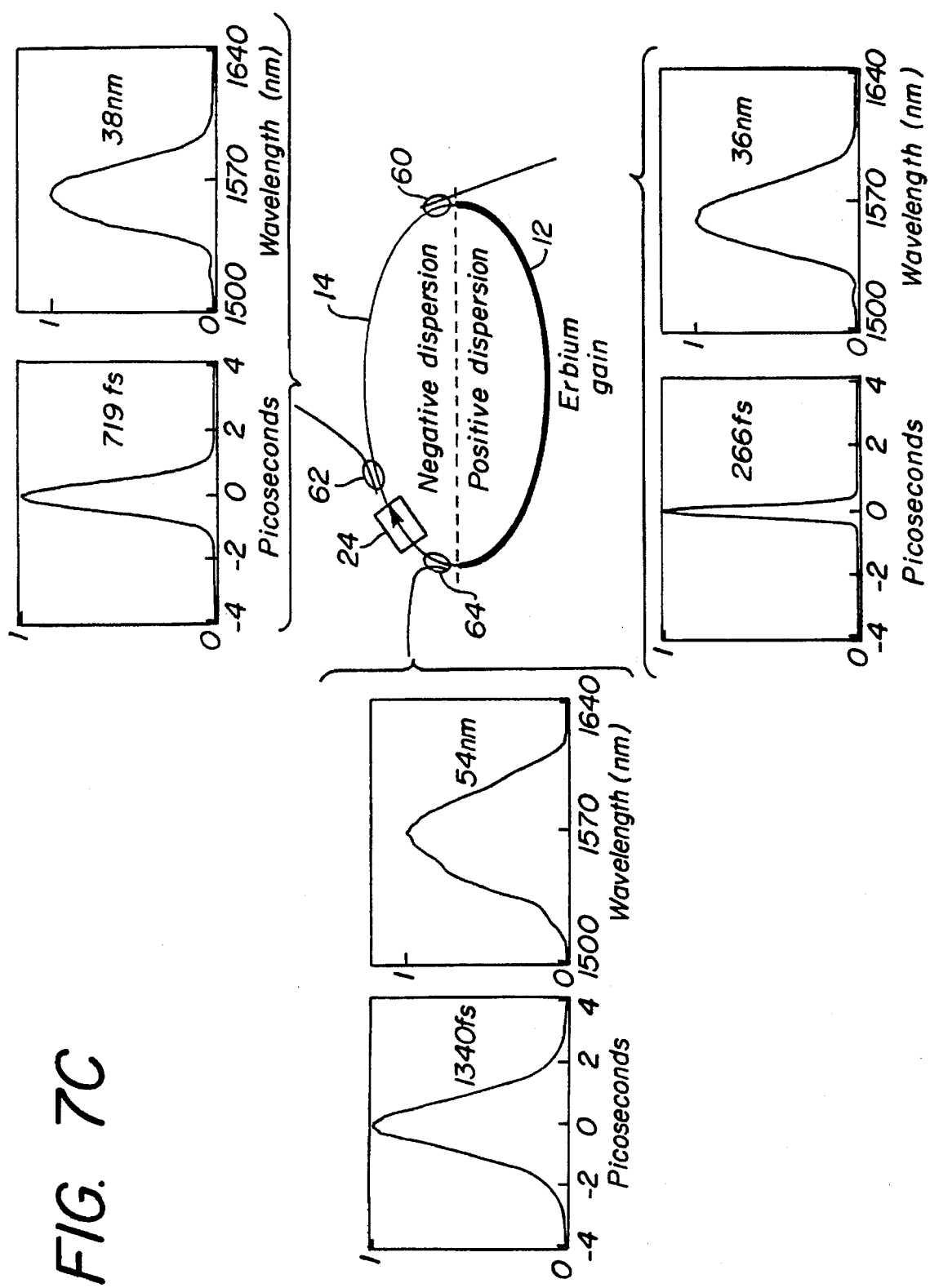
FIG. 7C is a schematic diagram of a second possible ring laser directionality and corresponding output spectra for the laser configuration of FIG. 1A.

In a second possibility, shown in FIG. 7C, the direction of the polarizer/isolator 24 is reversed, such that once the pulse traverses the gain segment 12 and has attained high energy and power, it immediately encounters the polarizer/isolator 24 before traversing the negative-dispersion segment. Again considering the three output locations, one at the end of the negative dispersion segment 60, one just after the polarizer/isolator 62, and one immediately before the polarizer/isolator 64, it is seen that the pulse width and spectrum are here also quite different. By far the optimum spectrum is seen to be achieved just before the isolator, at point 64. At this point, there are no sideband spectra and a 54 nm spectral spread is achieved. The positive chirping apparent in the pulse width may be compensated for using output coupling fiber, as explained below. Thus, it is preferable that the laser beam produced by the fiber ring laser of the invention be extracted at a point before the isolator 24, and further that the isolator be located just after the positive-dispersion segment 12 and that its directionality is such that the pulse encounters the isolator before traversing the remainder of the negative-dispersion segment.

Referring to FIG. 8, positioning of the output coupler 20 just after the positivedispersion segment 12 (with the isolator shown here only schematically at some arbitrary point in the negative-dispersion segment 14), means for positive chirp compensation are preferably provided at the output. A dispersive delay line, such as provided by a standard fiber, or other compensation means may be used. Using a fiber delay line, determination of the optimal fiber length for positive chirp compensation may be achieved empirically, by analyzing the pulse at various points along the length in comparison with the direct output pulse 66 extracted from the ring fiber.

This may be accomplished, e.g., by starting with say a 3 meter fiber segment 68, with negative dispersion, here being −0.022 ps$^2$/m, and analyzing the pulse 70a, 70b, etc., at varying points on the fiber segment 68. As a practical matter, this is accomplished by removing sections of the segment 70 until the autocorrelation with of the pulse is minimized. This analysis may be made by relating the fiber dispersion and autocorrelation to the pulse shape. Then matching of the output signal at a given fiber segment length with autocorrelation width and time-bandwidth product can determine the optimum output pulse. Here the best fit is obtained with D=−0.0002, and a fiber segment length of 169 cm. This produces a pulse 70d of 76 fs in duration. The pedestal under this main pulse is estimated to contain less than 3% of the total energy.

In a second embodiment of the fiber ring laser of the invention, the output coupling and pulse extraction scheme may be adapted to achieve even higher pulse energy than that attainable in the stretched-pulse operation described above. This alternative scheme is motivated by a desire to overcome one drawback of the fiber output coupler described above, that is, the fiber coupling removes only a small fraction (~10–20%) of the power in the laser cavity. Efficiency of the cavity and coupling is limited by internal losses. In the alternative scheme, the polarizer/isolator components are exploited for the two ports they provide; a first port, at the input polarizer, where linear polarization occurs, and a second port, at the output analyzer, which rejects power from the laser in order to shorten the laser pulse by removing the o so-called "wings" of the pulse intensity spectrum. These rejection ports may be employed as the main output coupler of the stretched-pulse fiber ring, eliminating .the earlier output coupler, and thereby reducing the associated intracavity loss to increase the overall laser efficiency.

Perhaps the major concern about this alternative output coupling scheme is that the output pulse quality may be expected to be poor in comparison with that extracted from the earlier coupling scheme. However, if the nonlinear phase shift provided in the APM polarizer is small, say <π/2, then the rejected pulse, though longer than the intracavity pulse, can still have a high-quality pulse profile. Furthermore, if the interferometric polarizer/isolator is biased to points of large loss at low intensities, then the power supplied to the rejection port may be a significant fraction of the intracavity power, reaching greater than 30% or even 50% of the intracavity power. It is seen that indeed, significant power gains may be obtained using this rejection port output coupler at the expense of only minor pulse-quality degradation.

Figure 9:
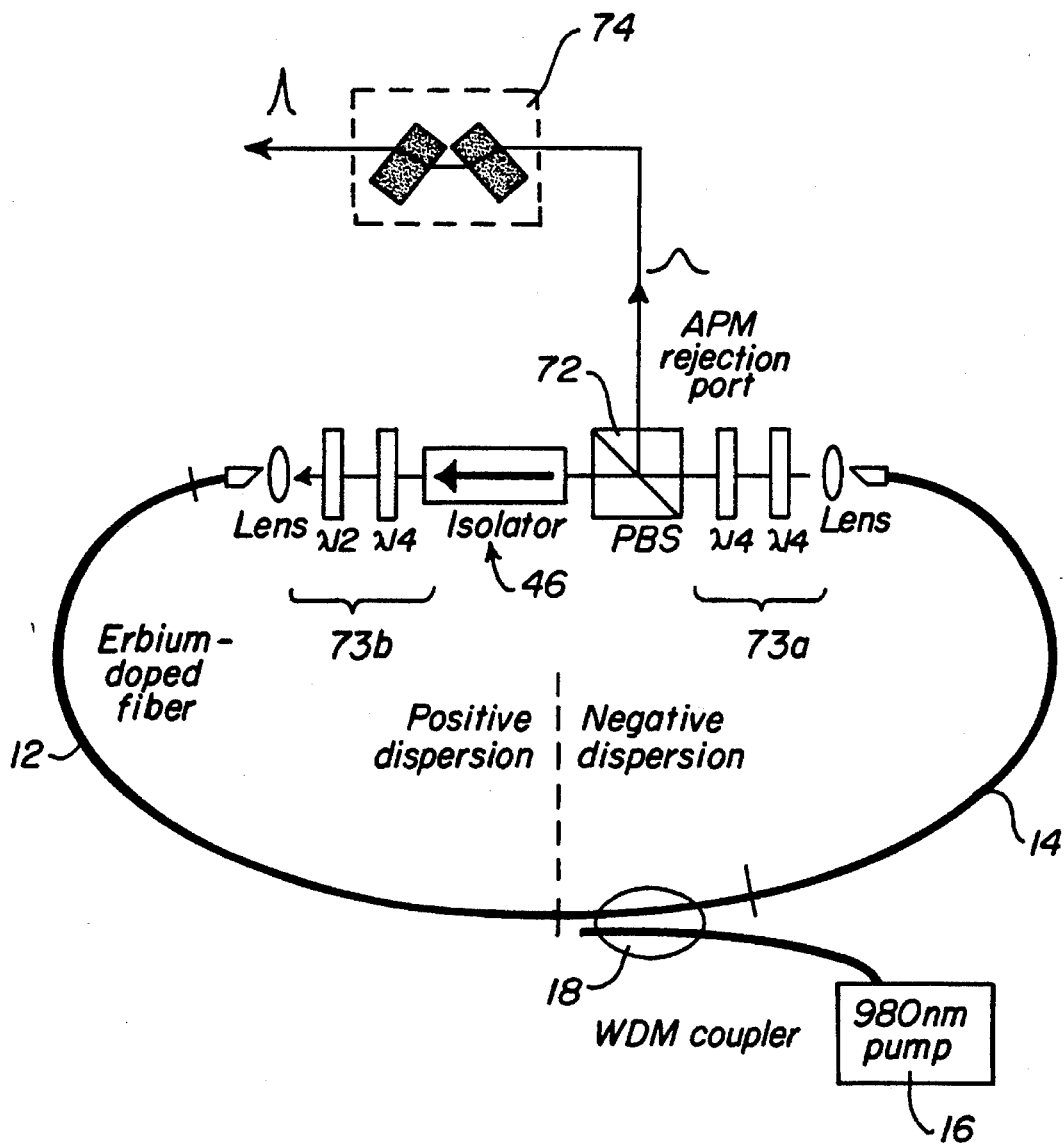
FIG. 9 is a second embodiment of a fiber ring laser according to the invention.

Referring to FIG. 9, in this output coupling scheme, a bulk polarization-sensitive isolator 46 is employed to force unidirectional operation of the fiber ring. The input to the isolator is here a polarizing beam splitter (PBS) 72. Pairs of bulk wave plates 73a, 73b before and after the isolator provide polarization control without the use of fiber. It has been found that bulk wave plates provide higher precision and reproducibility than fiber polarization controllers. Once the wave plate settings for mode-locked operation are found, the positions may be marked and mode locking may be reobtained with good reliability if the fiber is not disturbed. With this setup, the reflected s polarization of the PBS 72 acts as the rejection port for the polarization APM, giving a linearly polarized output pulse.

In this configuration, the fiber ring laser of the invention may be constructed of 2.5 m of Corning SMF28 fiber, with 45 cm of Corning Flexcor 1060 fiber forming the WDM coupler 18 for launching the pump laser 16, and 1.0 m of erbium-doped fiber providing the positive-dispersion gain segment 12. This configuration gives a fundamental pulse repetition rate of 48.2 MHz. The dispersions of the negativedispersion segment, WDM coupling segment, and positive-dispersion-segment are estimated at 1.55 μm to be −0.023, −0.007, and +0.075±0.005 ps$^2$/m, respectively. With these values, the net ring GVD is estimated at +0.016±0.005 ps$^2$. The dispersion of the bulk components is estimated to be negligible.

In operation of this laser configuration with the isolator directionality set such that the rejection port output coupler is at the end of the negative-dispersion segment 14, reliable self-starting mode locking is observable at 380 mW of incident pump power and 23 mW of output power at the PBS rejection port 72. Pulsing is selfsustained down to 180 mW of incident pump power and 10.5 mW or output power. After self-starting is obtained, the wave plate pairs 73a, 73b are adjusted for optimal output pulse shapes and spectra.

Figures 10A, 10B:
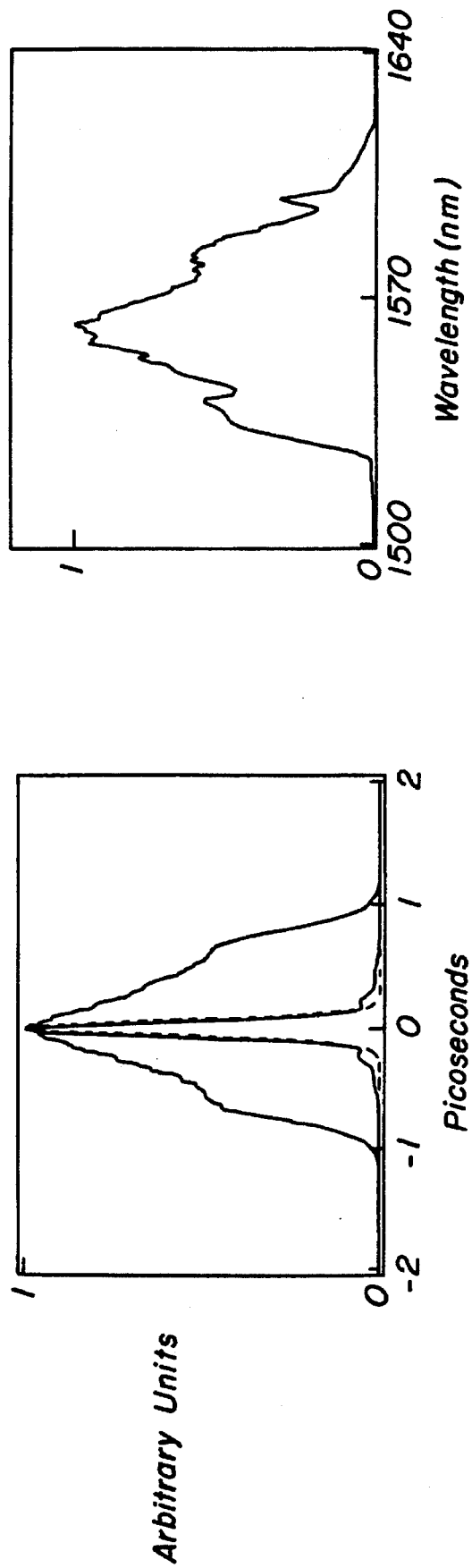
FIG. 10A is a plot of the autocorrelation of a laser pulse produced by the laser configuration of FIG. 9.
FIG. 10B is a plot of the wavelength spectrum of a laser pulse produced by the laser of FIG. 9.

To investigate the loss at the PBS rejection port 72, a fiber coupler may be added to the loop. Such a configuration confirms that approximately 50% of the power circulating in the fiber ring exits through the rejection port during pulsed operation, regardless of the intracavity wave plate settings. FIGS. 10A and 10B show the autocorrelation and spectrum, respectively, of the output pulse for 20 mW of output power, corresponding to a pulse energy of >0.4 nJ.

Due to the directionality and positioning of the isolator in this configuration, the output pulses here have a high negative chirp. Compensation for this negative chirp is achieved using a pair of silicon slabs 74, which facilitate direct, undeviated output by tilted positioning, as shown in the figure. The negative chirp compensation reduces the autocorrelation width from 1.1 ps to 141 fs, which corresponds to a 91 fs pulse, assuming a sech amplitude profile. If the silicon slabs are coated with an antireflection layer, the unchirped pulses could attain >5 kW of peak power. Other bulk compensators, such as other semiconductor materials, may also be used for this chirp compensation, as will be understood by those skilled in the art.

It is true that the wings of this pulse are larger than those observed with the standard output coupling. Comparing the compressed autocorrelation with an ideal sech (as shown in FIG. 10A), it is estimated that the non-sech component of the pulse contains ~10% of the total energy. The spectrum is seen to have a width of about 53 nm, which gives a time-bandwidth product of 0.59.

In this mode of operation, at very high energies, the output pulse autocorrelation and spectrum are seen to develop multiple peaks and complex structures, which are sensitive to the wave plate settings. These behaviors may be attributed to soliton effects, which are stronger in this configuration where the pulse output location is at the end of the negative-dispersion fiber segment 14—the locations of the gain segment 12 and the isolator loss in the ring cause the average power in the negative-dispersion segment 14 to be higher than in the optimum setting described above:

As one technique to minimize these effects, the directionality of the isolator 46 could be reversed such that pulses are extracted after passing through the gain segment 12 rather than the negative-dispersion segment 14. For this configuration, single-pulse energy of 0.78 nJ is achievable. Like the first ring configuration, this output scheme causes the output pulses to have a high positive chirp. A dispersive fiber delay line like that previously described may here again used to compensate for the chirp; at a length of 219 cm such a fiber segment is shown to reduce the pulse width to 83 fs. From a spectral width of 60 rim, this corresponds to a time-bandwidth product of 0.62.

At very high energies, self-phase modulation-induced spectral broadening is observed here, and the so-called wings of the spectrum are seen to contain as much as 40% of the pulse energy. Alternative chirp compensators, such as glass rods, highly dispersive prism pairs (such as silicon prisms), or grating pairs, may help to avoid such nonlinear effects and to achieve higher-quality compressed pulses. Furthermore, the use of external chirp compensation may be eliminated altogether if the PBS port is placed in the ring where the pulse width is a minimum. In any case, this rejection port output coupling scheme is shown to achieve significantly higher pulse energies than the standard output coupling of a stretched-pulse fiber ring, at the expense of relatively small degradations in pulse quality.

As will be recognized by those skilled in the art, there are many other variations in output coupling, mode locking, and laser cavity geometry which fall within the scope of the invention. Accordingly, the invention is not meant to be limited to only the foregoing description, but by the spirit and scope of the claims. For example, as mentioned earlier, the stretched-pulse, nonsoliton scheme of the invention may be applied to figure-eight, Sagnac loop reflector configuration, and other fiber laser geometries. It is clear that the same techniques of stretching with positive- and negative-dispersion fiber segments and net positive GVD may be applied with benefits to any such system that achieves passive modelocking using, e.g., nonlinear loop reflectors/transmitters.

Figure 11A:
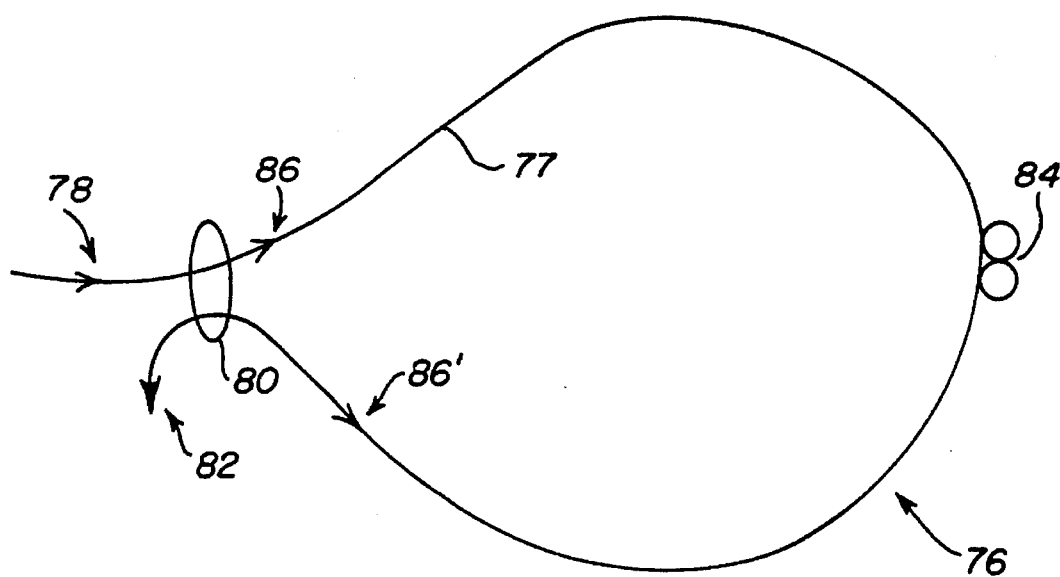
FIG. 11A is a schematic diagram of one possible nonlinear laser loop configuration to which the laser configuration of the invention may be applied.
Figure 11B:
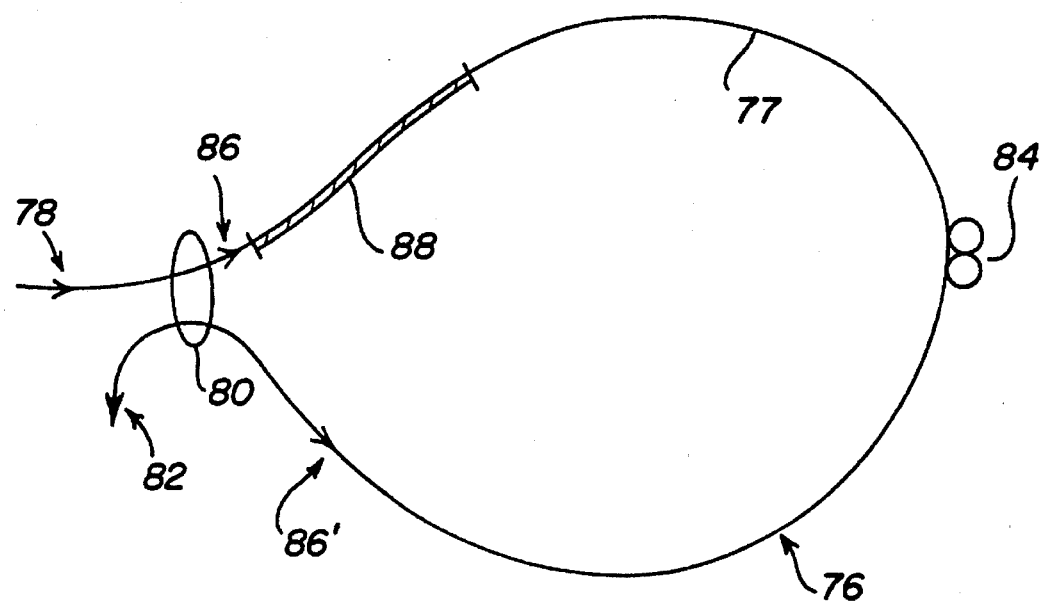
FIG. 11B is a schematic diagram of a second possible nonlinear laser loop configuration to which the laser configuration of the invention may be applied.

Referring to FIG. 11A, there is shown a loop reflector modelocking element 76 to which the stretched-pulse scheme may be applied. The reflector here is configured of a loop of fiber 77 into which is launched laser pulses at an input port 78, with a coupler 80, providing reflection/transmission as well as a location for a port 82 for possible laser pulse extraction. Polarization controllers 84 are positioned somewhere along the fiber loop. In a polarization maintaining loop, no controllers are used, however. In operation, to achieve nonlinear passive modelocking, light launched from the input port 78 through the coupler 80 may travel in either direction 86 or 86', around the loop 77. If the intensity of light propagating in one direction, say 86, is greater than the intensity of light propagating in the other direction, say 86', then the light of greater intensity (86) will acquire a larger nonlinear phase shift, due to the Kerr effect, than will light of the lesser intensity (86'). Fields recombining at the coupler 80 reflect if they are in phase, and transmit if they are out of phase. Based on this action, the loop 76 may be designed to achieve either higher transmission or alternatively, higher reflection, for high-intensity light.

A selected irabalancing of intensity between counter-propagating fields (86 and 86') may be achieved by choosing for the coupler 80 a non-50/50 coupler such as a 60/40 coupler. Alternatively, as shown in FIG. 1B, such imbalancing is accomplished by the placement of a gain fiber segment 88 asymmetrically within the loop o configuration. In this case, because light moving in one direction, say 86, will encounter the gain segment 88 before traversing amajority Of the loop length, this light will acquire a larger nonlinear phase shift than light traveling in the opposite direction 86', in which the gain fiber segment 88 is encountered at the end of a loop traversal.

Figure 12A:
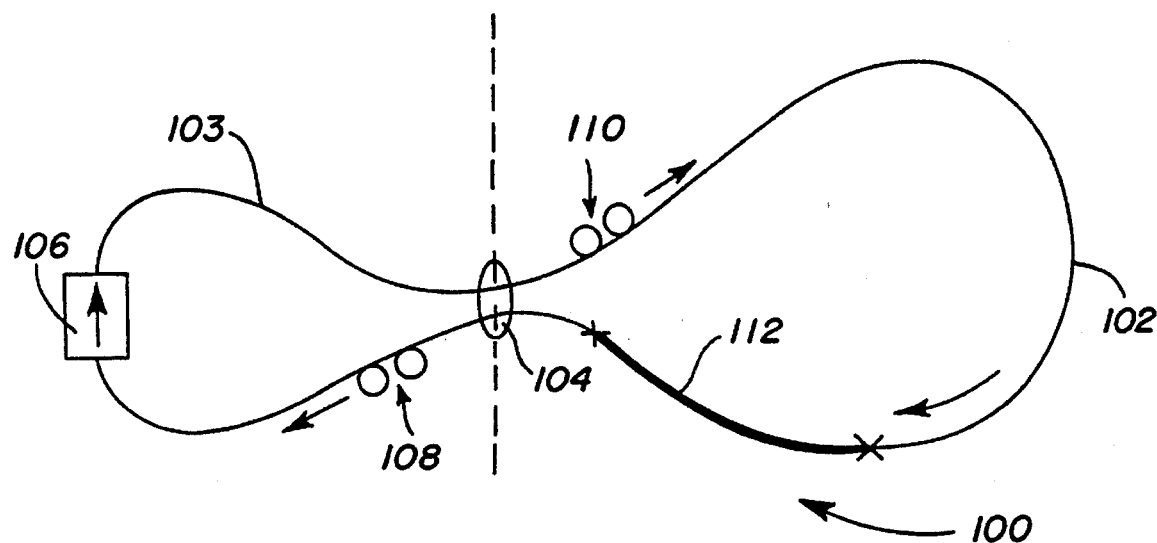
FIG. 12A is a schematic diagram of a figure eight laser configuration according to the invention.

With this basis for nonlinear loop operation, the stretched-pulse scheme of the invention may be directly applied to nonlinear loop configurations. Referring to FIG. 12A, a figure eight laser configuration 100 using a loop mirror in the transmissive mode is illustrated. Such a laser configuration includes a negative-dispersion fiber segment 102 forming a nonlinear loop, in which is positioned an erbium or other rare-earth doped gain fiber section 112, also of negative dispersion. A positive-dispersion fiber loop 103 is connected to this nonlinear loop via a coupler 104, and includes an isolator 106 positioned along the positive-dispersion fiber segment 103. Polarization controller 108 and 110 are positioned in each side of the figure eight. With this configuration, the figure eight laser achieves the stretched-pulse operation of the invention. As will be recognized by those skilled in the art, the lengths and positioning of the positive- and negative-dispersion fiber are selected to achieve performance goals for the laser pulses generated by the loop. For example, the positive-dispersion fiber loop 103 may contain a segment of negative-dispersion fiber (not shown). In this case, the negative-dispersion fiber would be connected directly to the negative dispersion fiber of the nonlinear loop 102.

Figure 12B:
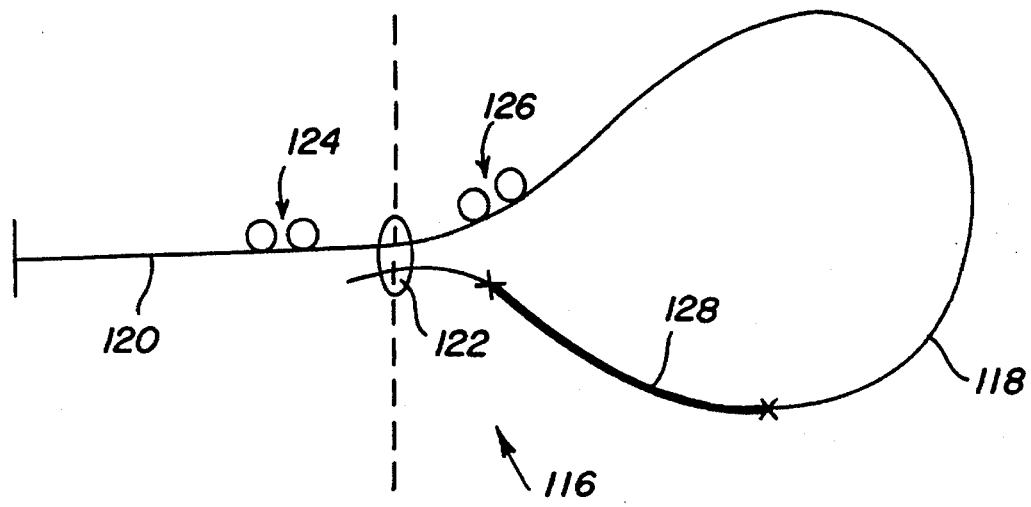
FIG. 12B is a schematic diagram of a Sagnac reflector laser configuration according to the invention.

Similarly, as shown in FIG. 12B, a Sagnac loop reflector 116, using a loop mirror in the reflective mode, may be configured to achieve stretched-pulse operation. Here the reflector includes a negative dispersion fiber loop 118 forming the nonlinear loop, in which a negative-dispersion gain fiber segment 128 is positioned. A positivedispersion fiber segment 120 is connected to the nonlinear loop at a coupler 122. Polarization controllers 124 and 126 are positioned along the fiber positive-dispersion and negative-dispersion segments, respectively. As in the figure eight configuration,. here a segment of negative-dispersion fiber may be included in the positive-dispersion section 120, in which case the negative-dispersion fiber would be connected directly to the negative-dispersion fiber of the nonlinear loop 118.

There are many variations to these figure eight and Sagnac reflector configurations, beyond the specific configurations just described, that are contemplated by the stretched-pulse laser scheme of the invention. For example, the location of the positive- and negative-dispersion fiber in these lasers may be reversed; i.e., the nonlinear loops 102 and 118 of the figure eight and Sagnac reflector, respectively, may be of positive- rather than negative-dispersion fiber, with the remaining segment 103, and 120, respectively, being of negative dispersion fiber. Here again, segments of positive dispersion fiber may be interposed into the negative-dispersion fiber segment and connected directly to the positive dispersion segment of the nonlinear loop. Those skilled in the art will recognize that this is just one of the many alternative laser configurations possible under the fiber scheme of the invention.

The invention is thus seen to provide a quite general technique for stretched-pulse fiber laser operation which attains high energy ultrashort pulses heretofore unachievable using conventional, negative GVD, soliton-based operation.

We claim:

1. A method for suppressing soliton effects on a laser pulse circulating in a modelocked fiber laser cavity, comprising the steps of:

propagating the intracavity laser pulse through a first fiber segment characterized by positive group velocity dispersion; and propagating the intracavity laser pulse through a second fiber segment characterized by negative group velocity dispersion, the propagation of the laser pulse through the first and second fiber segments producing laser pulse width variations between maximum- and minimum width values of sufficient magnitude to suppress soliton effects as the laser pulse circulates within the laser cavity.

2. The method of claim 1 further comprising the step of propagating the intracavity laser pulse through a gain fiber segment doped with at least one rare-earth element.

3. The method of claim 2 further comprising the step of pumping the gain fiber segment with a semiconductor diode source.

4. A method for forming a laser pulse comprising the steps of:

pumping a gain fiber segment to initiate formation of a laser pulse;

propagating the laser pulse through the gain fiber segment to amplify the laser pulse;

modelocking the laser pulse; and propagating the laser pulse through a first fiber segment characterized by positive group velocity dispersion and through a second fiber segment characterized by negative group velocity dispersion to produce variations in laser pulse width between maximum and minimum width values of sufficient magnitude to suppress soliton effects on the laser pulse.

5. The method of claim 4 wherein the gain fiber segment is doped with at least one rare earth element.

6. The method of claim 4 further comprising the step of circulating the laser pulse a number of times through a laser cavity comprising the gain fiber segment, the positive group velocity dispersion fiber segment, and the negative group velocity dispersion fiber segment.

7. The method of claim 6 wherein the laser cavity through which the laser pulse is circulated is characterized by a net positive group velocity dispersion.

8. The method of claim 6 wherein the laser cavity through which the laser pulse is circulated is a linear cavity configuration.

9. The method of claim 6 wherein the laser cavity through which the laser pulse is circulated is a ring cavity configuration.

10. The method of claim 6 wherein the laser cavity through which the laser pulse is circulated is a figure eight cavity configuration.

11. The method of claim 6 further comprising the step of extracting a laser pulse from the laser cavity through an intensity dependent rejection port of a polarization rotator in the cavity, whereby off-peak laser pulse energy rejected by the polarizer is extracted from the laser cavity through the rejection port.

12. The method of claim 11 further comprising the step of propagating the extracted laser pulse through a dispersive element to compensate for any chirp exhibited by the extracted pulse.

13. The method of claim 4 wherein the step of modelocking the laser pulse comprises passive modelocking of the laser pulse.

14. The method of claim 13 wherein the step of passive modelocking the laser pulse comprises additive pulse modelocking of the laser pulse.

15. The method of claim 4 wherein the step of pumping the gain fiber segment comprises injecting radiation from a semiconductor diode source into the gain fiber segment.

16. A modelocked fiber laser cavity comprising:

a modelocker for modelocking an intracavity laser pulse;

a gain fiber segment for amplifying the intracavity laser pulse, the gain fiber segment characterized by positive group velocity dispersion; and a fiber segment characterized by negative group velocity dispersion, the positive group velocity dispersion of the gain fiber segment and the negative group velocity dispersion of the negative dispersion fiber segment selected such that propagation of a laser pulse through the gain fiber segment and the negative dispersion fiber segment produces laser pulse width variations between maximum and minimum width values of sufficient magnitude to suppress soliton effects as the laser pulse circulates within the laser cavity.

17. The modelocked fiber laser cavity of claim 16 wherein the laser cavity is characterized by a net positive group velocity dispersion.

18. The modelocked fiber laser of claim 16 wherein the gain fiber segment is doped with at least one rare-earth element.

19. The modelocked fiber laser cavity of claim 16 further comprising a semiconductor diode source for pumping the gain fiber segment.

20. A modelocked fiber laser cavity comprising:

an isotropic Kerr medium for intensity-dependent self-initiation of an intracavity laser pulse and modelocking of the initiated pulse;

a gain fiber segment for amplifying the intracavity laser pulse; and a first fiber segment characterized by positive group velocity dispersion and a second fiber segment characterized by negative group velocity dispersion, the positive group velocity dispersion of the first fiber segment and the negative group velocity dispersion of the second fiber segment selected such that propagation of a laser pulse through the first and second fiber segments produces laser pulse width variations between maximum and minimum width values of sufficient magnitude to suppress soliton effects as the laser pulse circulates within the laser cavity.

21. The modelocked fiber laser cavity of claim 20 wherein the laser cavity is characterized by a net positive group velocity dispersion.

22. The modelocked fiber laser cavity of claim 20 wherein the gain fiber segment is doped with at least one rare-earth element.

23. The modelocked fiber laser cavity of claim 20 further comprising a semiconductor diode source for pumping the gain fiber segment.

* * * * *